United States Patent
McAllister

(10) Patent No.: US 11,815,112 B1
(45) Date of Patent: Nov. 14, 2023

(54) ANCHOR PIN FOR MOTORCYCLE STEERING SPINDLE ASSEMBLY

(71) Applicant: Daniel J. McAllister, Woodstock, GA (US)

(72) Inventor: Daniel J. McAllister, Woodstock, GA (US)

(*) Notice: Subject to any disclaimer, the term of this patent is extended or adjusted under 35 U.S.C. 154(b) by 0 days.

(21) Appl. No.: 17/463,235

(22) Filed: Aug. 31, 2021

(51) Int. Cl.
  *F16B 19/02* (2006.01)
  *B62K 21/12* (2006.01)
  *B23P 6/00* (2006.01)

(52) U.S. Cl.
  CPC ............ *F16B 19/02* (2013.01); *B23P 6/00* (2013.01); *B62K 21/12* (2013.01); *Y10T 29/49718* (2015.01)

(58) Field of Classification Search
  CPC ..... Y10T 29/49718; B23P 6/00; B62K 21/12; F16B 19/02
  See application file for complete search history.

(56) References Cited

U.S. PATENT DOCUMENTS

| | | | | |
|---|---|---|---|---|
| 599,058 | A * | 2/1898 | Gadd | B62K 21/18 403/77 |
| 2,495,859 | A * | 1/1950 | Mennesson | B62K 19/34 280/281.1 |
| 4,068,858 | A * | 1/1978 | Harrison | B62K 21/18 280/288.4 |
| 4,323,263 | A * | 4/1982 | Cook | B62K 21/18 280/279 |
| 4,566,712 | A * | 1/1986 | Motrenec | B62K 21/08 280/90 |
| 5,272,936 | A * | 12/1993 | Nagano | B62K 21/06 280/279 |
| 5,938,225 | A * | 8/1999 | Scheibe | B62K 21/06 384/619 |
| D418,096 | S | 12/1999 | Hubbart | |
| 6,022,299 | A | 2/2000 | Stewart | |
| 6,106,438 | A | 8/2000 | Dean | |
| 6,145,637 | A * | 11/2000 | Hopey | B62K 21/08 280/272 |
| 9,079,630 | B2 * | 7/2015 | Alstrin | B62K 21/18 |
| D846,667 | S | 4/2019 | Yu | |
| D849,166 | S | 5/2019 | Dingman et al. | |

(Continued)

OTHER PUBLICATIONS

Traxxion Dynamics | "Steering Safety Pin" | website located at: <https://traxxion.com/product/steering-safety-pin-2018-gold-wing/> | printed on: Jun. 2, 2023 | date first available: Sep. 3, 2020.

(Continued)

*Primary Examiner* — Jason L Vaughan
(74) *Attorney, Agent, or Firm* — Hanrahan Law Firm, P.A.; Benjamin M. Hanrahan

(57) ABSTRACT

An anchor pin that is precisely structured and machined to fit within a internal bore of a spindle rod of a motorcycle steering spindle assembly is presented herein. The anchor pin is configured and intended to provide additional structural integrity to and reinforce the spindle rod in the event of damage thereto or failure thereof. Accordingly, the anchor pin includes an elongated cylindrical shaft with a flared head disposed at one end thereof. The elongated cylindrical shaft includes at least one recessed ring disposed along a length thereof, and at least one resilient o-ring seated therein.

9 Claims, 8 Drawing Sheets

(56) References Cited

U.S. PATENT DOCUMENTS

| | | | |
|---|---|---|---|
| D857,143 S | 8/2019 | Mateko | |
| D884,097 S | 5/2020 | Ameri et al. | |
| D893,642 S | 8/2020 | Henniger et al. | |
| D897,465 S | 9/2020 | Johnston | |
| D919,022 S | 5/2021 | Yang | |
| D946,093 S | 3/2022 | Park | |
| 11,311,766 B2 | 4/2022 | Park | |
| 2007/0052201 A1* | 3/2007 | Hermansen | B62K 21/06 280/279 |
| 2007/0170690 A1* | 7/2007 | Hermansen | B62K 1/00 280/280 |
| 2018/0333609 A1 | 11/2018 | Zerbo et al. | |
| 2018/0353797 A1 | 12/2018 | Lin et al. | |
| 2021/0362798 A1* | 11/2021 | Robinson | B62K 21/06 |
| 2021/0394849 A1* | 12/2021 | Liu | B62K 21/18 |
| 2022/0063672 A1* | 3/2022 | Corbett | B60W 60/0016 |

OTHER PUBLICATIONS

Max McAllister & Traxxion Dynamics | "2018+ Honda Goldwing Potential Total Steering Failure !!! " | YouTube video located at: <https://www.youtube.com/watch?v=TRzde_Ery50&t=33s> | printed on: Jun. 2, 2023 | date first available: Sep. 3, 2020.

Max McAllister & Traxxion Dynamics | "In-Depth Look at Potential Steering Failure of 2018+ Honda Goldwing by Max from Traxxion Dynamics" | YouTube video located at: <https://www.youtube.com/watch? v=cv8tsuYK2wQ&t=895s> | printed on: Jun. 2, 2023 | date first available: Sep. 18, 2020.

Max McAllister & Traxxion Dynamics | "Demonstration of Traxxion Dynamics Steering Safety Pin on 2018+ Honda Goldwing" | YouTube video located at: <https://www.youtube.com/watch?v=d4-WIYjEFfU> | printed on: Jun. 2, 2023 | date first available: Sep. 24, 2020.

Max McAllister & Traxxion Dynamics | "Traxxion Dynamics Stainless Steel Steering Spindle Installed on 2018+ Honda Goldwing" | YouTube video located at: <https://www.youtube.com/watch?v=vVwZUg7F1to> | printed on: Jun. 2, 2023 | date first available: Sep. 24, 2020.

Max McAllister & Traxxion Dynamics | "How to Install Traxxion Dynamics Steering Safety Pin for 2018+ Honda Goldwing by Max McAllister" | YouTube video located at: <https://www.youtube.com/watch?v=U-5-vSu0g6w> | printed on: Jun. 2, 2023 | date first available: Sep. 28, 2020.

Max McAllister & Traxxion Dynamics | "Max from Traxxion drives Goldwing with broken Steering Spindle !!! " YouTube vide located at: <https://www.youtube.com/watch?v=OjpMH1rdMHk> | printed on: Jun. 2, 2023 | date first available: Oct. 19, 2020.

\* cited by examiner

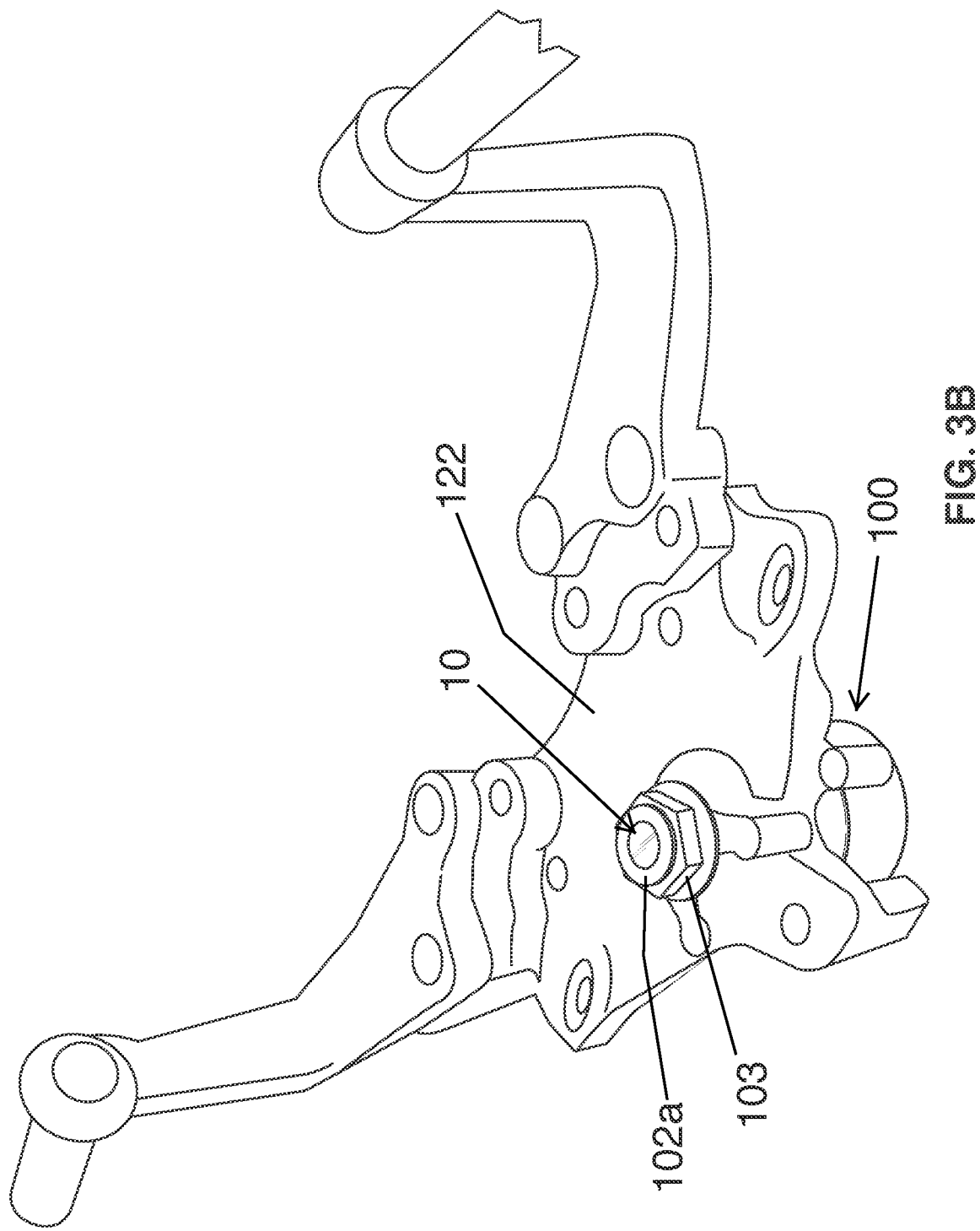

ANCHOR PIN FOR MOTORCYCLE STEERING SPINDLE ASSEMBLY

FIELD OF THE INVENTION

The present invention is generally directed to an anchor pin that is sized to fit within, and therefore reinforce, a central bore of a spindle rod of a motorcycle steering spindle assembly.

BACKGROUND OF THE INVENTION

Every motorcycle includes various steering components that allow the rider to control the steering and, therefore, the direction of travel of a motorcycle. Those components can include, but are certainly not limited to a handlebar assembly, which includes a steering bridge, one or more tie rods interconnected between the steering bridge and a steering arm, and one or more steering spindle assemblies. As the handlebar assembly and/or steering bridge is turned or pivoted by the rider during operation of the motorcycle, for example, about a steering axis, the tie rod(s) operate to control the movement or direction of the front wheel of the motorcycle, often via other intermediary components.

More in particular, the motorcycle steering spindle assembly is a collection of components that at least partially interconnect the handlebar assembly and/or steering bridge to the motorcycle and may include a spindle rod and spindle cylinder. As just an example, the spindle rod may include an upper threaded end, a bottom base or shelf, and a middle or intermediate threaded section. In some cases, a cylinder is anchored or mounted to the spindle rod by being seated at one end on or against the bottom base or shelf, and at the other end via one or more anchor caps, end nuts or caste nuts threaded onto the intermediate threaded section of the spindle rod. In some cases, upper and/or lower bearing assemblies may also be included to facilitate rotational movement of the motorcycle steering spindle assembly for intended operation. Furthermore, the top end of the spindle rod may be disposed through the handlebar assembly, for example, through the steering bridge and secured thereto via an upper or steering crown nut.

In some cases, the integrity of the steering spindle assembly may become compromised or otherwise cause the handlebars to rock back and forth or up and down on the spindle rod. As just an example, if the upper or steering crown nut is over torqued or tightened too much, it can cause too much pressure to be applied to the intermediate anchor or castle nut, causing the intermediate threads to be deformed or damaged, or otherwise causing the intermediate castle nut to engage or contact the cylinder or end cap. These, and other, deformities can cause the handlebars or handlebar assembly to rock (e.g., up and down or side-to-side) about the spindle assembly. In some cases, the rocking or additional pressure applied to spindle rod can cause the spindle rod to fail, particularly at weak points caused by the intermediate threaded components. Eventually, the spindle rod may break, chip, crack, or completely fail, at which time, control of the motorcycle via the handlebar assembly, and in particular, control of the direction of the front wheel can be completely eliminated. This can, of course, cause the rider to lose control the motorcycle, particularly if the failure occurs during operation of the motorcycle, which can then lead to accidents and severe injury or death.

This problem and susceptibility of failure or damage to spindle rod or spindle assembly can be exacerbated in motorcycles that have a spindle rod manufactured or constructed out of aluminum or lightweight metals and materials. In addition, some spindle rods, whether made of aluminum steel or other materials, include a hollow interior bore or are otherwise not solid. The hollow interior bore of the spindle rod can contribute to an additional lack of structural integrity thereof and can therefore contribute or at least partially contribute to the failure thereof.

As just one example, the HONDA® GOLD WING® touring motorcycle, and in particular, the 2018, 2019, and 2020 HONDA® GOLD WING® touring motorcycle, includes a spindle rod that is made or manufactured of aluminum and which includes a central bore or opening. This central bore or opening through the spindle rod begins at the upper end thereof, and extends down through the spindle rod, to and past the intermediate threads. In this manner, the hollow interior of the spindle rod, along with the aluminum material from which the spindle rod is manufactured, can contribute to the inadvertent failure or damage to the spindle rod or other portions of the spindle assembly, as provided herein. It should be noted that other motorcycles, motorbikes, cycles or two- or three-wheeled vehicles, in addition to or instead of the HONDA® GOLD WING® touring motorcycle may include a spindle rod or spindle assembly with a similar construction (e.g., with a central hollow cylindrical bore) which may cause or contribute to failure or damage thereto. Therefore, while the present application mentions the spindle rod and spindle assembly of the 2018 (and newer) HONDA® GOLD WING® motorcycle, the present invention, as disclosed herein, is not limited to use or operation with this motorcycle, and thus other motorcycles or motored vehicles can benefit from the present invention.

SUMMARY OF THE INVENTION

Accordingly, the present invention is directed to an anchor pin that is precisely structured and machined to fit within (e.g., via a slip fit) the internal bore of a spindle rod of a motorcycle steering spindle assembly. The anchor pin is configured and intended to provide additional structural integrity to and reinforce the spindle rod in the event of damage thereto or failure thereof. In this manner, in the event of damage to the spindle rod or spindle assembly, the anchor pin will provide support and maintain a connection between the handlebar assembly and the spindle assembly. This will, therefore, maintain at least some control of the steering of the motorcycle or vehicle, even with damage to the spindle rod itself.

More specifically, the anchor pin of at least one embodiment includes an elongated cylindrical shaft and a flared head. The elongated cylindrical shaft includes at least one, although in some cases a plurality of recessed rings or grooves disposed along a length thereof, and at least one, although in some cases a plurality of resilient o-rings or gaskets seated within the recessed ring(s). The elongated cylindrical shaft of the anchor pin includes a circumference that is precisely sized to fit within the bore of the spindle rod of the motorcycle steering spindle assembly. When installed, the top end or top surface of the head will be disposed flush with or substantially even with the top end of the spindle rod.

These and other objects, features and advantages of the present invention will become more apparent when the drawings as well as the detailed description are taken into consideration.

BRIEF DESCRIPTION OF THE DRAWINGS

FIG. 3B is a perspective view of the anchor pin installed within the bore of the spindle rod as disclosed in accordance with at least one embodiment of the present invention.

Like reference numerals refer to like parts throughout the several views of the drawings provided herein.

DETAILED DESCRIPTION OF THE INVENTION

Figure 1A:
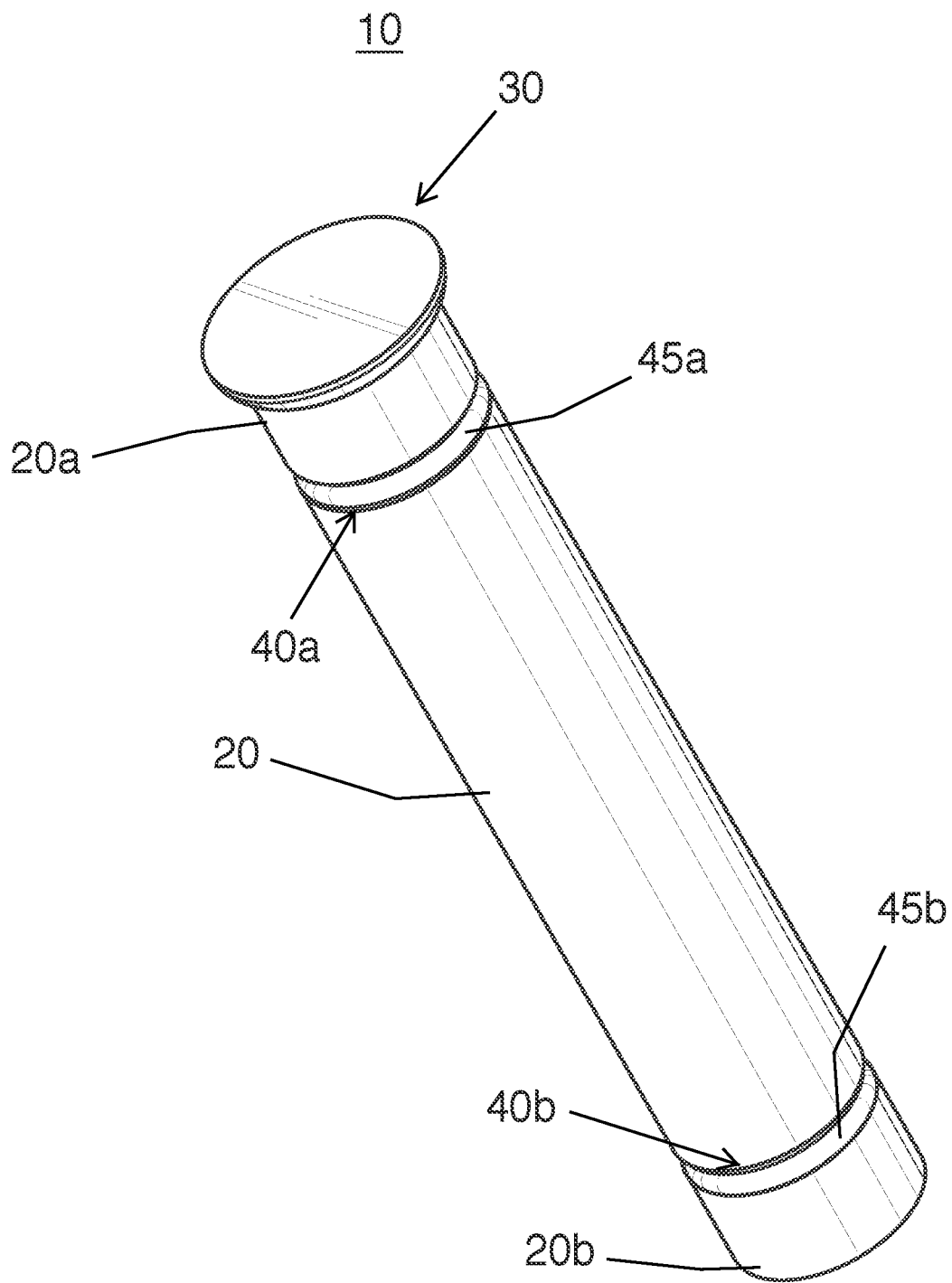
FIG. 1A is a perspective view of the anchor pin as disclosed in accordance with at least one embodiment of the present invention.
Figure 1B:
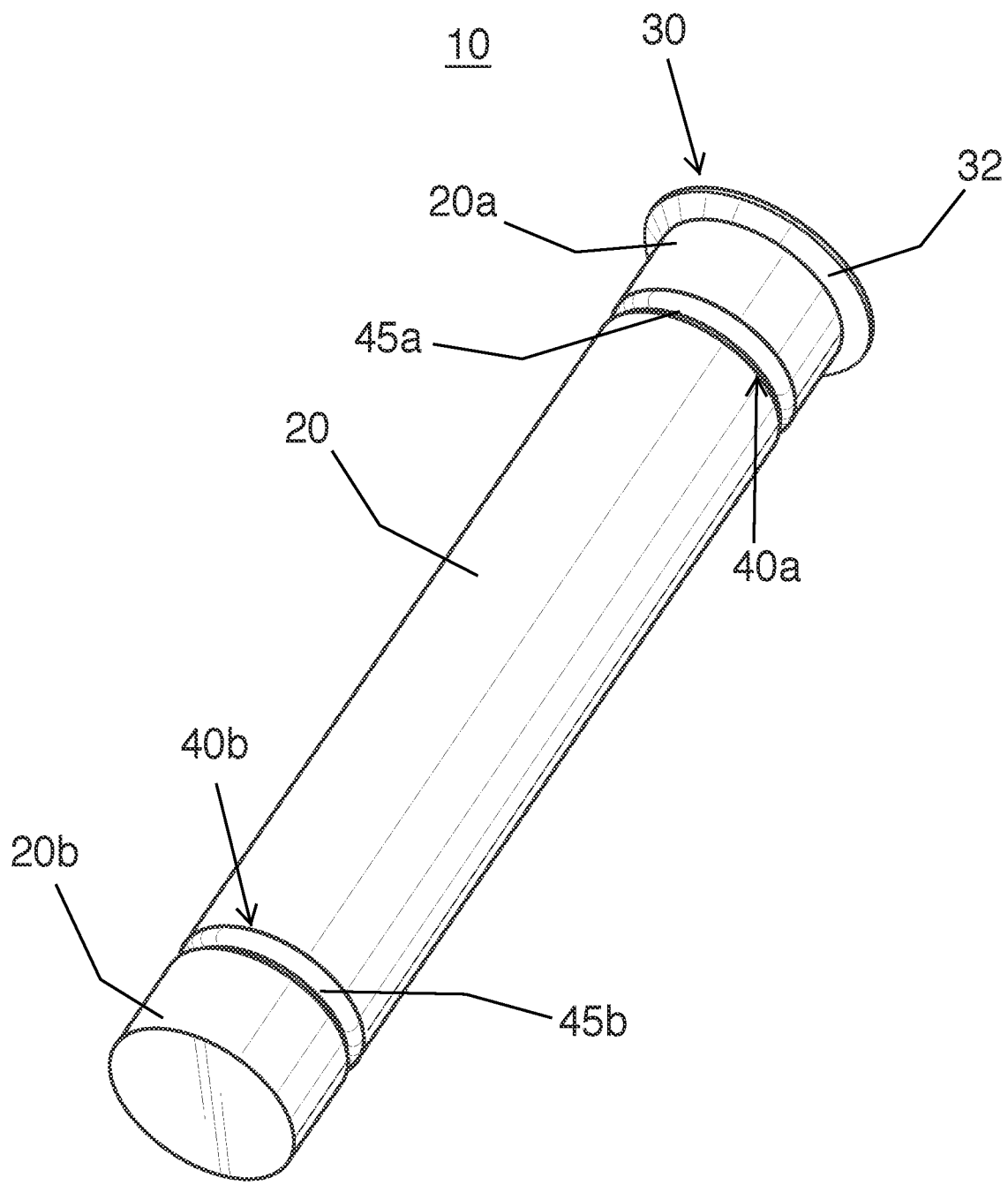
FIG. 1B is another perspective view of the anchor pin illustrated in FIG. 1A.
Figure 1C:
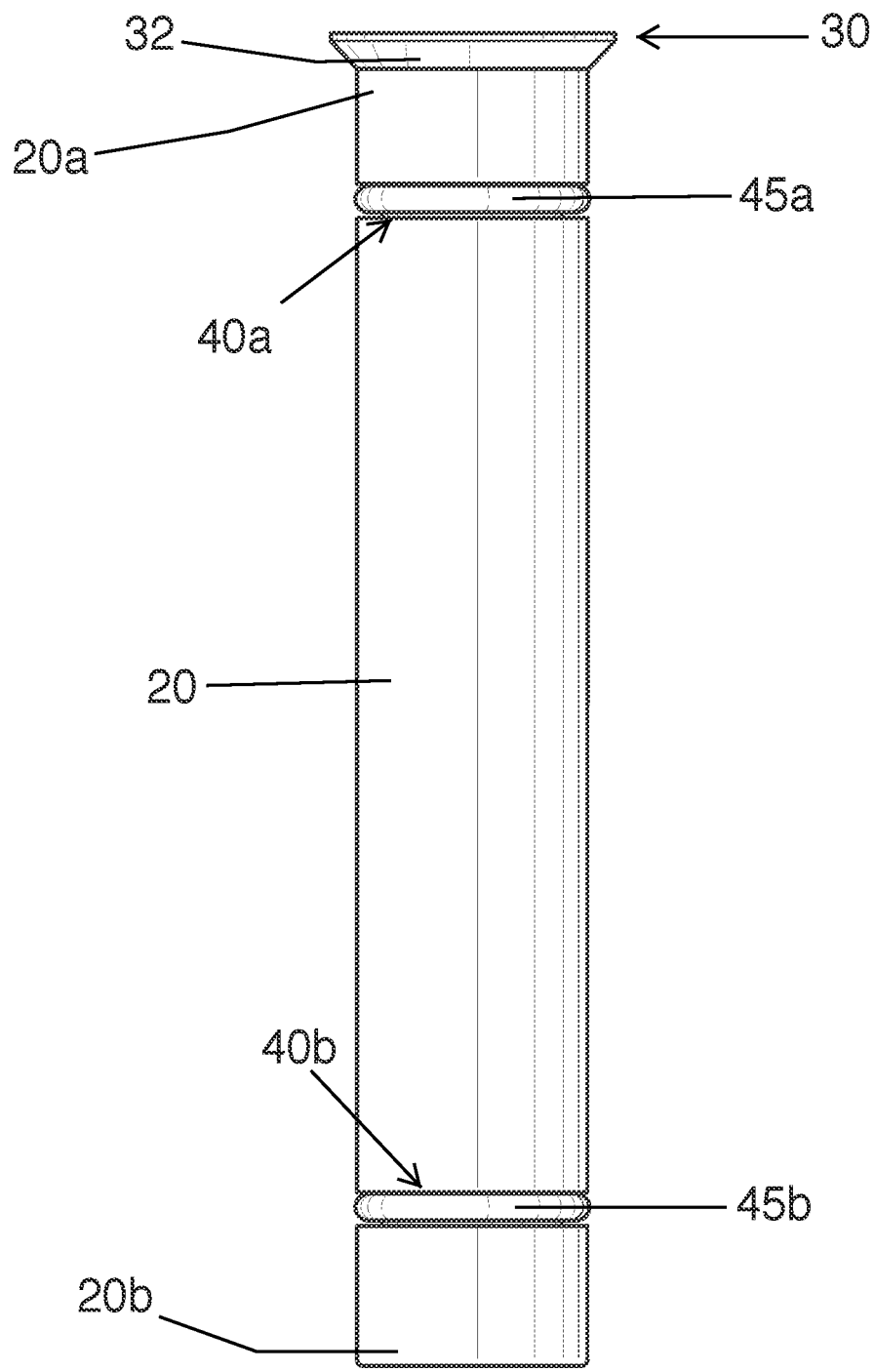
FIG. 1C is a side elevation view of the anchor pin illustrated in FIGS. 1A-1B.
Figure 1D:
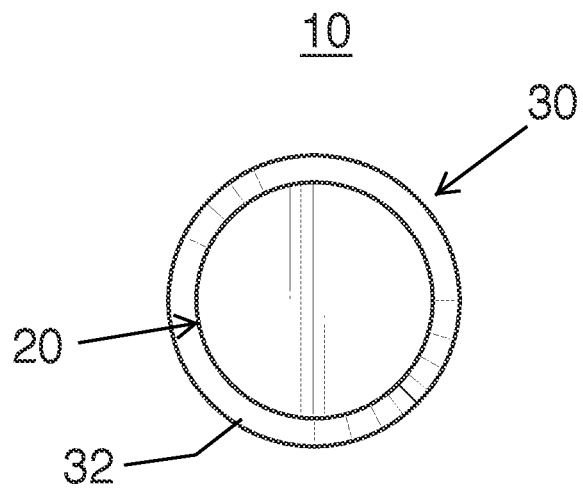
FIG. 1D is a bottom view of the anchor pin illustrated in FIGS. 1A-1C.
Figure 1E:
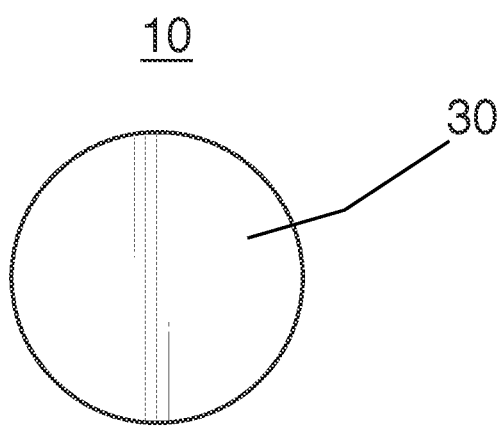
FIG. 1E is a top view of the anchor pin illustrated in FIGS. 1A-1D.
Figure 2:
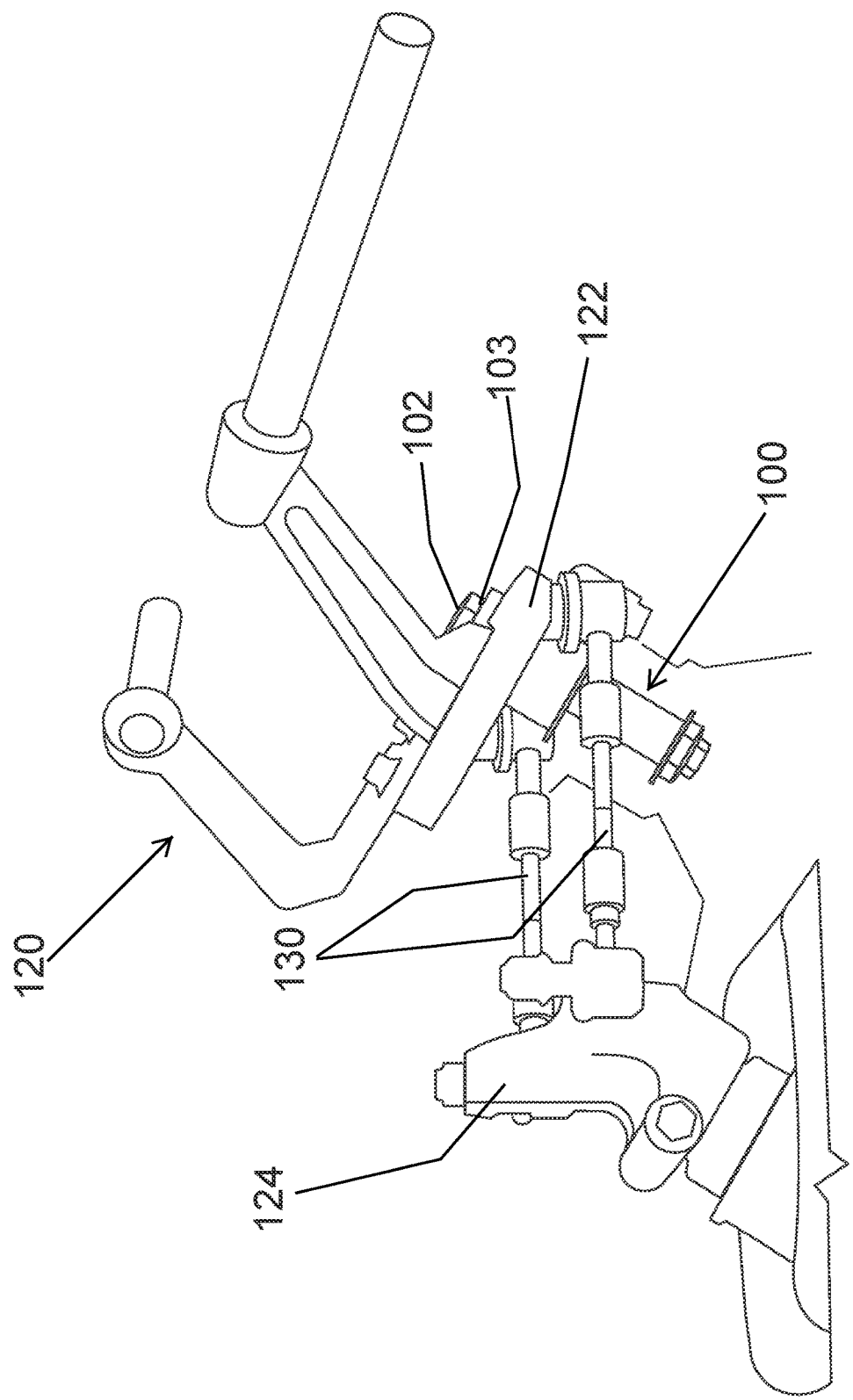
FIG. 2 is an exemplary perspective view of the handlebar assembly, spindle assembly and tie rods of a motorcycle.
Figure 3A:
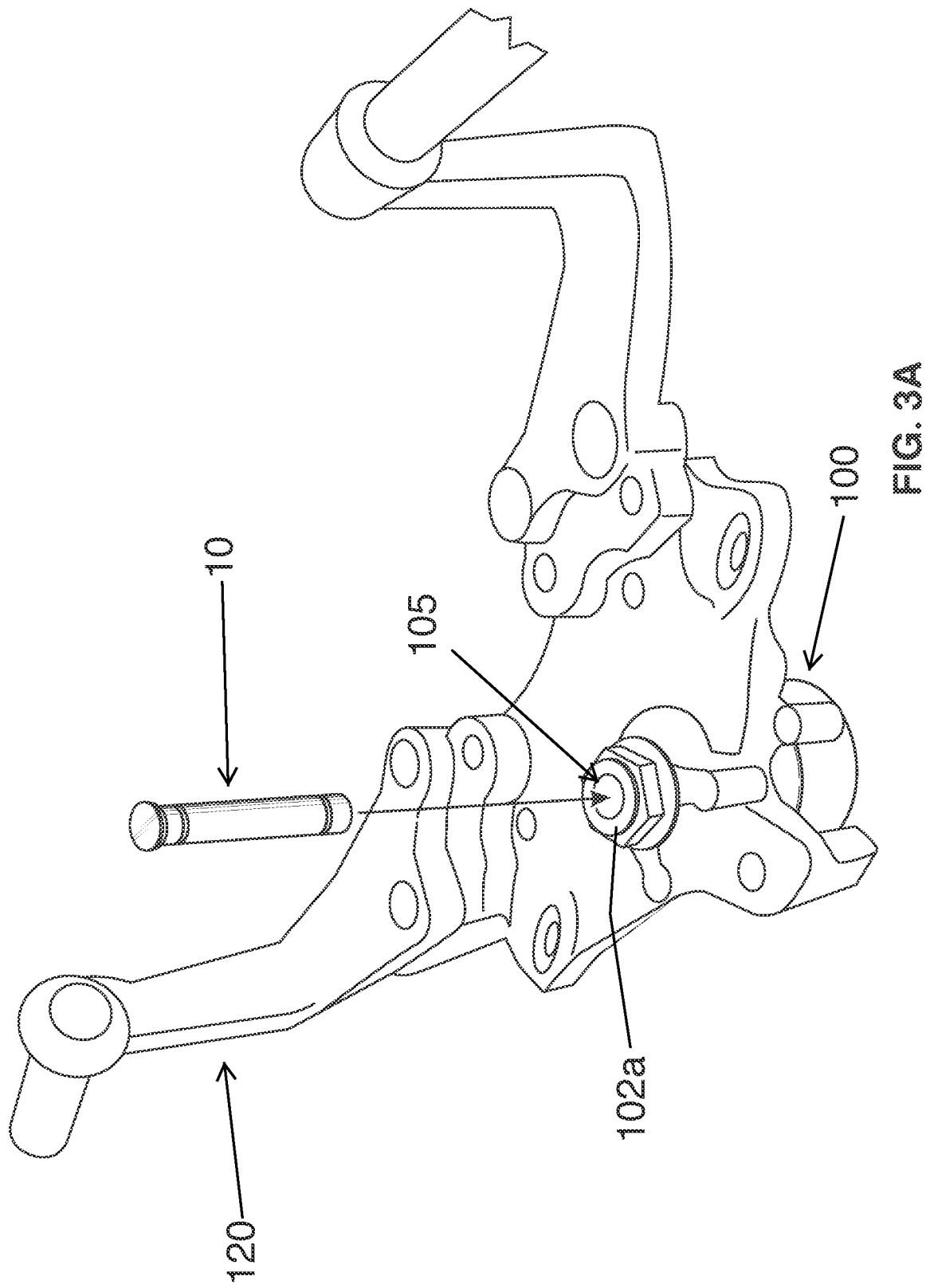
FIG. 3A is a perspective and partially exploded view of the installation of the anchor pin as disclosed in accordance with at least one embodiment of the present invention.

As shown in the accompanying drawings, and with particular reference to FIGS. 1A-1E, the present invention is directed to an anchor pin, generally shown at 10, for use with and to reinforce a spindle rod 102 of a motorcycle spindle assembly 100, for instance, as shown in FIGS. 2 and 3A-3B.

More specifically, most if not every motorcycle includes various steering components that allow the rider to control the steering and, therefore, the direction of travel of a motorcycle. Those components can include, but are certainly not limited to a handlebar assembly 120, which includes a steering bridge 122, one or more tie rods 130 interconnected between the steering bridge 122 and a steering arm 124, and one or more steering spindle assemblies 100. As the handlebar assembly 120 and/or steering bridge 122 is turned or pivoted by the rider during operation of the motorcycle, for example, about a steering axis, the tie rod(s) 130 operate to control the movement or direction of the front wheel (not shown) of the motorcycle, often via other intermediary components.

More in particular, the motorcycle steering spindle assembly 100 is a collection of components or structures that at least partially interconnects the handlebar assembly 120 and/or steering bridge 122 to the motorcycle and may include a spindle rod 102 and spindle cylinder 110. As just an example, the spindle rod 102 may include an upper threaded end 102a, a bottom base or shelf 102b, and a middle or intermediate threaded section 102c. In some cases, a cylinder 110 is anchored or mounted to the spindle rod 102 by being seated at one end on or against the bottom base or shelf 102b, and at the other end via one or more anchor caps 104a, end nuts or caste nuts 104b threaded onto the intermediate threaded section 102c of the spindle rod 102. In some cases, upper and/or lower bearing assemblies (not shown) may also be included to facilitate rotational movement of the motorcycle steering spindle assembly for intended operation. Furthermore, the top end 102a of the spindle rod 102 may be disposed through the handlebar assembly 120, for example, through the steering bridge 122 and secured thereto via an upper or steering crown nut 103.

In some cases, the integrity of the steering spindle assembly 100 may become compromised or otherwise cause the handlebars 120 to rock back and forth or up and down on the spindle rod 102. As just an example, if the upper or steering crown nut 103 is over torqued or tightened too much, it can cause too much pressure to be applied to the intermediate anchor or castle nut 104b, causing the intermediate threads 102c to be deformed or damaged, or otherwise causing the intermediate castle nut 104b to engage or contact the cylinder or end cap 104a.

These, and other, deformities can cause the handlebars or handlebar assembly 120 to rock (e.g., up and down or side-to-side) about the spindle assembly 100. In some cases, the rocking or additional pressure applied to spindle rod 102 can cause the spindle rod 102 to fail, particularly at weak points caused by the intermediate threaded components 102c. Eventually, the spindle rod 102 may break, chip, crack, or completely fail, at which time, control of the motorcycle via the handlebar assembly 120, and in particular, control of the direction of the front wheel can be completely eliminated. This can, of course, cause the rider to lose control the motorcycle, particularly if the failure occurs during operation of the motorcycle, which can then lead to accidents and severe injury or death.

This problem and susceptibility of failure or damage to the spindle rod 102 or spindle assembly 100 can be exacerbated in motorcycles that have a spindle rod 102 manufactured or constructed out of aluminum or lightweight metals and materials. In addition, some spindle rods, whether made of aluminum steel or other materials, include a hollow interior bore 105 or are otherwise not solid. The hollow interior bore 105 of the spindle rod can contribute to an additional lack of structural integrity thereof and can therefore contribute or at least partially contribute to the failure thereof.

As just one example, the HONDA® GOLD WING® touring motorcycle, and in particular, the 2018, 2019, 2020, and newer HONDA® GOLD WING® touring motorcycle, includes a spindle rod 102 that is made or manufactured of aluminum and which includes a central bore 105 or opening therein. This cylindrical central bore 105 or opening through the spindle rod 102 begins at the upper end 102a thereof, and extends down through the spindle rod 102, to and past the intermediate threads 102c. In this manner, the hollow interior bore 105 of the spindle rod 102, along with the aluminum material from which the spindle rod 102 is manufactured, can contribute to the inadvertent failure or damage to the spindle rod 102 or other portions of the spindle assembly 100, as provided herein.

It should be noted that other motorcycles, motorbikes, cycles or two- or three-wheeled vehicles, in addition to or instead of the HONDA® GOLD WING® touring motorcycle may include a spindle rod or spindle assembly with a similar construction (e.g., with a central hollow cylindrical bore) which may cause or contribute to failure or damage thereto. Therefore, while the present application mentions the spindle rod and spindle assembly of the 2018 (and newer) HONDA® GOLD WING® motorcycle, the present invention, as disclosed herein, is not limited to use or operation with this motorcycle, and thus other motorcycles or motored vehicles can benefit from the present invention.

Accordingly, with reference again to FIGS. 1A-1E, the present invention is directed to an anchor pin 10 which is structured and configured to be disposed within the interior bore 105 of the spindle rod 102 in order to provide support, rigidity and/or reinforcement thereto in the event of a failure of or damage to the spindle rod 102 or spindle assembly 10, for example, either during operation of the motorcycle or during transportation of the motorcycle, such as while being tied down on a trailer. More in particular, the anchor pin 10 of the present invention is intended to provide additional support and structural integrity to the spindle assembly 100 such that in the event the spindle rod 102 or other component of the spindle assembly 100 fails, the rider or operator of the vehicle will still maintain some control over the steering of the vehicle, at least to prevent or minimize the likelihood that a catastrophic accident would occur.

Specifically, the anchor pin 10 of at least one embodiment includes a shaft 20 sized and configured to fit within the internal bore 105 of the spindle rod 102. In this manner, the shaft 20 of at least one embodiment includes an elongated cylindrical configuration with a circumference or outer surface that is slightly smaller than the circumference of the bore 105. In some embodiments, as illustrated in FIGS. 1A, 1B and 1C, the pin 10 includes a head 30 with an enlarged or flared configuration relative to the shaft 20. For instance, as seen in the side view of FIG. 1C, the head 30 of at least one embodiment includes an outwardly tapered shoulder 32 that extends from the top or first end 20a. In some embodiments, the top end of the head 30 includes a flat surface or configuration although it is contemplated that the top surface may have other shapes or forms, including a convex configuration, concave configuration, etc.

Furthermore, disposed along the length of the shaft 20, e.g., between the top or first end 20a and the bottom or second end 20b, is at least one recessed ring 40a, 40b. More specifically, the recessed ring(s) 40a, 40b are defined as area(s) along the length of the shaft 20 that exhibit or include a smaller circumference than the adjacent areas of the shaft 20 and define a channel or groove perpendicular to the longitudinal axis of the shaft 20 within which a corresponding o-ring, gasket, seal or other like structure, referenced as 45a, 45b is seated or disposed. For instance, the o-ring, gasket or seal may be constructed of a resilient material, including but in no way limited to rubber, silicone rubber, thermoplastic polyurethane, etc.

More specifically, the o-ring(s) or gaskets 45a, 45b of at least one embodiment can be used to retain the pin 10 or shaft 20 within the bore 105. In particular, since the shaft 20 of the pin is precisely machined or sized in a manner such that it can "slip-fit" within the bore 105, an o-ring or other like structure 45a, 45b can be used to retain the pin 10 or shaft 20 within the bore 105. In addition, the one or more o-rings 45a, 45b may also operate to prevent or minimize the pin 10 or shaft from clicking or rattling within the bore 105, for example, during operation of the motorcycle and particular as the motorcycle drives over bumps.

With reference to the embodiment of FIGS. 1A through 1C, the pin 10 may include a plurality of recesses, channels or grooves, such as a first recessed ring 40a and a second recessed ring 40b, and a plurality of corresponding o-rings or gaskets such as a first o-ring 45a and a second o-ring 45b disposed along the length of the shaft 20 in a spaced manner from one another. For instance, the first o-ring 45a may be seated or disposed with in the first recessed ring 40a, and the second o-ring 45b may be seated or disposed within the second recessed ring 40b. Of course, additional or fewer recessed rings, grooves or channels and additional corresponding o-rings or gaskets may be disposed along the length of the shaft 20 in other embodiments within the full spirit and scope of the present invention.

Moreover, in at least one embodiment, the first recessed ring 40a and the corresponding first o-ring 45a disposed therein may be disposed adjacent or near the top end 20a of the shaft 20, e.g., adjacent or near the flared head 30. For instance, the first recessed ring 40a and first o-ring 45a may be disposed between the first end 20a of the shaft and a center point of the shaft 20 (e.g., the half way point along the length of the shaft 20). In some cases, the first recessed ring 40a and the first o-ring 45a may be positioned closer to the first end 20a of the shaft 20 than to the center point of the shaft 20.

Similarly, in at least one embodiment, the second recessed ring 40b and the corresponding second o-ring 45b disposed therein may be disposed adjacent or near the bottom or second end 20b of the shaft 20. For instance, the second recessed ring 40b and second o-ring 45b may be disposed between the center point of the shaft 20 and the second end 20b of the shaft 20. In some cases, the second recessed ring 40b and the second o-ring 45b may be positioned closer to the second end 20b of the shaft 20 than to the center point of the shaft 20.

Moreover, it should also be noted that in at least one embodiment, the elongated cylindrical shaft 20 of the pin 10 included a uniform or constant circumference between the first end 20a and the second end 20b, with the exception of recessed rings or grooves 40a, 40b and corresponding o-rings or gaskets 45a, 45b. This configuration is intended to match or correspond with the shape and configuration of the bore 105 of the spindle rod 102. More in particular, the bore 105 of the spindle rod 102 of some motorcycles extends from a top or first end 102a of the spindle rod 102, past the intermediate threads 102c, and at least partially into the depth of the cylinder 110. In this manner, the shaft 20 of the anchor pin 10 of at least one embodiment of the present invention is precisely machined and sized to fit and slide down into the bore 105 through the top end 102a of the spindle rod 102. The o-ring(s) 45a, 45b and recessed rings 40a, 40b of at least one embodiment are sized such that the o-ring(s) 45a, 45b extend to and in some cases slightly beyond the outer surface or outer circumference of the shaft 20. In this manner, the o-ring(s) 45a, 45b of at least one embodiment can operate to retain the shaft 20 within the bore 105, for example, via friction.

Figure 4:
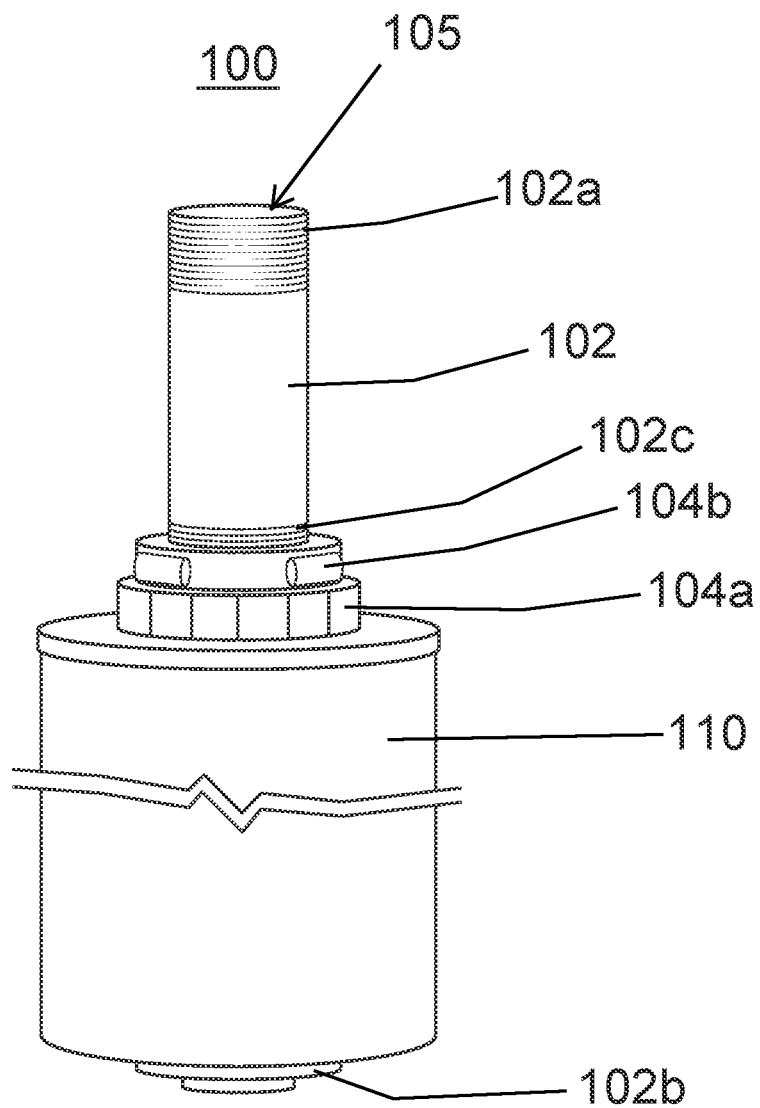
FIG. 4 is a side view of an exemplary spindle assembly as disclosed herein.

Furthermore, in at least one embodiment, the pin 10 of includes a shaft 20 with a length that allows the shaft 20 to extend into the bore 105 to and in some cases past the intermediate threads 102c. More specifically, the intermediate threads 102 can be considered a weak point of the spindle rod 102, and thus, in order to provide sufficient reinforcement and support to the spindle rod 102 and in an effort to prevent catastrophic accidents in the event of damage to failure of the spindle rod 102, the shaft 20 of the pin 10 may extend to and in some cases past the intermediate threads 102c, for example, while the top end of the pin head 30 is flush with or substantially even with the top end 102a of the spindle rod 102. In some cases, the shaft 20 includes a length that allows the shaft to extend at least partially into the cylinder 110 or otherwise down past the top end of the cylinder 110, as represented as point P in FIG. 4.

In some cases, or embodiments, the shaft 20 may include a length of approximately six inches, although other sizes, whether longer or shorter are contemplated within the full spirit and scope of the present invention. It should also be noted that the pin 10, and in particular, the shaft 20 thereof, may be constructed out of a rigid and durable material sufficient to provide the intended structural support and reinforcement described herein. Thus, the pin and/or shaft of the present invention may be solid and constructed out of steel, stainless steel, etc.

Moreover, at least one embodiment of the present invention is directed to a method of reinforcing the spindle rod of a motorcycle spindle assembly. The method includes providing an anchor pin that is precisely manufactured and sized to fit within the bore 105 of the spindle rod 102. The anchor pin may include an elongated shaft 20, an enlarged or flare head 30, and one or more o-rings or gaskets disposed within corresponding recessed grooves along the length of the shaft 20. The method further includes disposing or sliding the anchor pin 10 into the bore 105 of the spindle rod 102 until the enlarged head 30 is flush with or substantially even with the top or upper end of the spindle rod 102. Once installed, the anchor pin 10 will provide additional structural integrity to the spindle assembly, as disclosed herein.

It should also be noted that in most cases, installation of the anchor pin 10 may include or require the temporary removal of some additional motorcycle components, such as, but not limited to a center console (not shown) and/or various coverings (not shown) in order to access the spindle rod or spindle assembly. In many cases the anchor pin of the present invention can be installed in ten minute or less.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A method of reinforcing a motorcycle steering spindle assembly, comprising:
    providing an anchor pin, said anchor pin comprising:
        an elongated cylindrical shaft and a flared head,
        the elongated cylindrical shaft comprising at least one recessed ring disposed along a length thereof, and
        at least one resilient o-ring seated within said at least one recessed ring,
        wherein said elongated cylindrical shaft comprises a circumference sized to fit within a bore of a spindle rod of the motorcycle steering spindle assembly, and
    disposing the anchor pin into the bore of the spindle rod of the motorcycle steering spindle assembly.

2. The method as recited in claim 1 wherein the at least one recessed ring comprises a first recessed ring and a second recessed ring disposed in a spaced relation from one another along the length of the elongated cylindrical shaft.

3. The method as recited in claim 2 wherein the at least one resilient o-ring comprises a first resilient o-ring and a second resilient o-ring, the first resilient o-ring seated within the first recessed ring and the second resilient o-ring seated within the second recessed ring.

4. The method as recited in claim 3 wherein the first recessed ring is disposed adjacent the flared head and a first end of the elongated cylindrical shaft, and wherein the second recessed ring is disposed adjacent a second end of the elongated cylindrical shaft, the first end being opposite the second end.

5. The method as recited in claim 4 wherein the first recessed ring is disposed closer to the first end of the elongated cylindrical shaft than to a center of the elongated cylindrical shaft.

6. The method as recited in claim 5 wherein the second recessed ring is disposed closer to the second end of the elongated cylindrical shaft than to the center of the elongated cylindrical shaft.

7. The method as recited in claim 3 wherein the first resilient o-ring comprises an outer surface that extends to an outer surface of the elongated cylindrical shaft.

8. The method as recited in claim 7 wherein the second resilient o-ring comprises an outer surface that extends to the outer surface of the elongated cylindrical shaft.

9. The method as recited in claim 1 wherein the at least one resilient o-ring comprises an outer surface that extends to an outer surface of the elongated cylindrical shaft.

* * * * *